United States Patent [19]
Bollinger et al.

[11] 3,969,698
[45] July 13, 1976

[54] CLUSTER STORAGE APPARATUS FOR POST PROCESSING ERROR CORRECTION OF A CHARACTER RECOGNITION MACHINE

[75] Inventors: Ellen Willis Bollinger, Poughkeepsie, N.Y.; Anne Marie Chaires, Lanham, Md.; Jean Marie Ciconte, Rockville, Md.; Allen Harold Ett, Bethesda, Md.; John Joseph Hilliard, Potomac, Md.; Donald Francis Kocher; Walter Steven Rosenbaum, both of Silver Spring, Md.

[73] Assignee: International Business Machines Corporation, Armonk, N.Y.

[22] Filed: Oct. 8, 1974

[21] Appl. No.: 513,202

[52] U.S. Cl. .................... 340/146.3 WD; 179/1 SD
[51] Int. Cl.² .......................................... G06K 9/00
[58] Field of Search ............. 340/146.3 WD, 172.5, 340/146.3 ED; 179/1 SA, 1 SB, 1 SM, 1 SD

[56] References Cited
UNITED STATES PATENTS

| | | | |
|---|---|---|---|
| 3,188,609 | 6/1965 | Harmon et al. | 340/146.3 WD |
| 3,492,653 | 1/1970 | Fosdick et al. | 340/146.3 WD |
| 3,533,069 | 10/1970 | Garry | 40/146.3 WD |
| 3,651,459 | 3/1972 | Hahn | 340/146.3 WD |

*Primary Examiner*—Leo H. Boudreau
*Attorney, Agent, or Firm*—John E. Hoel; John W. Henderson, Jr.

[57] ABSTRACT

A cluster storage apparatus is disclosed for outputting groups of valid alpha words as potential candidates for the correct form of an alpha word misrecognized by a character recognition machine. Groups of alpha words are arranged in the cluster storage apparatus such that adjacent locations contain alpha words having similar character recognition misread propensities. Alpha words which have been determined to be misrecognized, are input to the cluster storage apparatus. Numerical values assigned to the characters of which the input word is composed, are used to calculate the address of that group of valid alpha words having similar character recognition misread propensities. The cluster storage apparatus then outputs the accessed groups of alpha words for subsequent processing. The organization of the cluster storage apparatus minimizes the difference in address between alpha words with similar character recognition misread propensities by assigning high numeric values to highly reliable characters, as determined by measuring the character transfer function of the character recognition machine.

10 Claims, 7 Drawing Figures

FETCH PROCESS

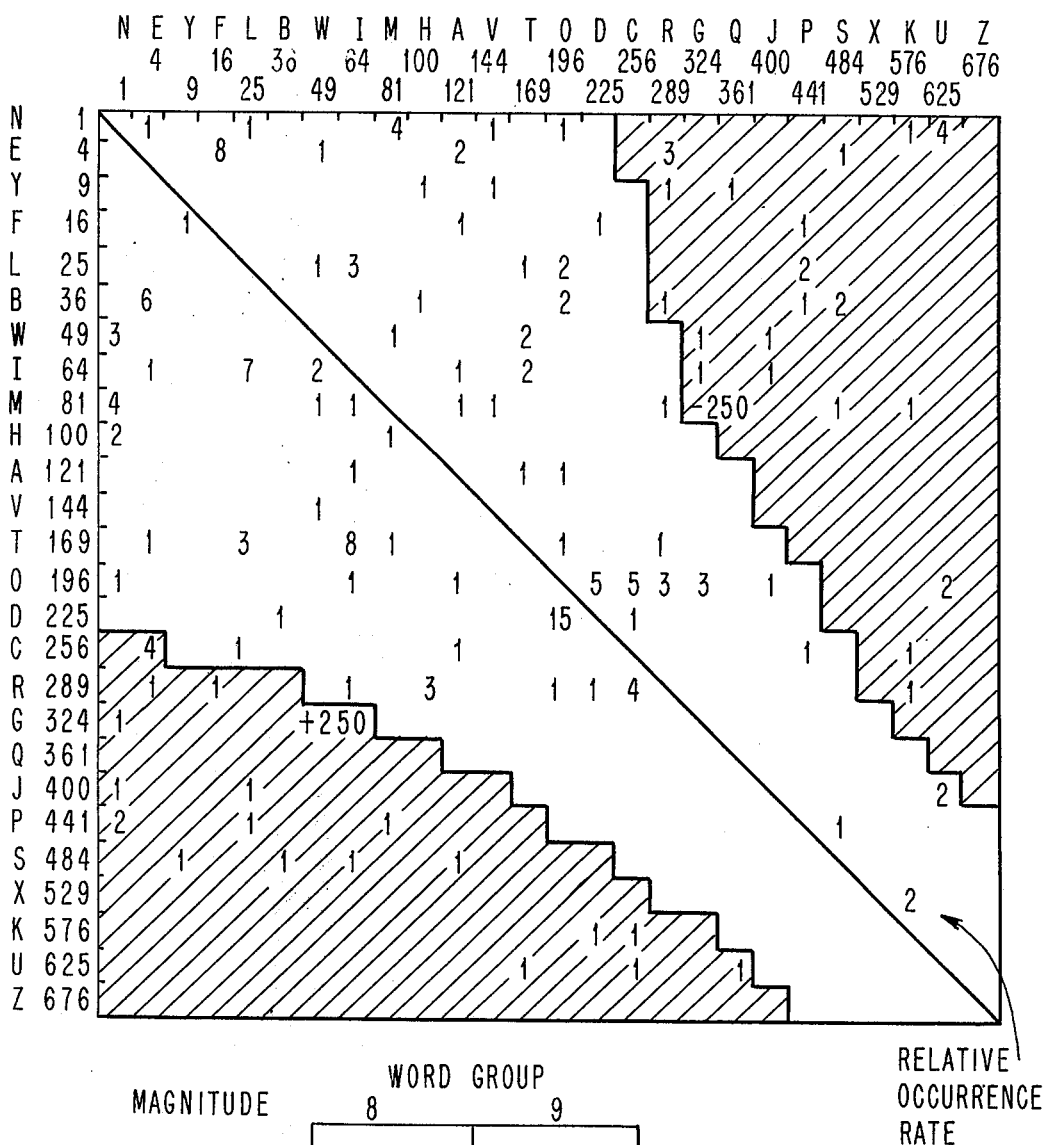
FIG. 3 SUBSTITUTION MATRIX
FIG. 4 DICTIONARY STORAGE FOR THE SECOND DIMENSIONAL ACCESS

CLUSTER STORAGE APPARATUS FOR POST PROCESSING ERROR CORRECTION OF A CHARACTER RECOGNITION MACHINE

FIELD OF THE INVENTION

The invention disclosed herein relates to data processing devices and more particularly relates to post processing devices for character recognition machines such as optical character readers and speech analyzers. The invention can also be applied to the analysis of typographical errors resultsing from the use of a standard keyboard.

BACKGROUND OF THE INVENTION

From its technical debut, the optical character recognition machine (OCR) has had unique potential for purposes of text processing applications. Its input processing rate far exceeds that of keypunch or typewriter inputs and its output is in machine readable form. Despite these very important attributes, optical character recognition machines have made only minor inroads to overall text processing applications. This may be principally due to the tendency of state of the art character recognition machines to generate a substantial percentage of erroneous misreads when a variety of fonts and formats are scanned.

When multifont nonformatted optical character recognition is attempted, problems arise which are not as prevalent in unifont applications. They stem from the highly error prone character recognition environment which is created when the character recognition machine operation is performed over many different alphabetic and numeric fonts with minimum control exercised over text conventions and typographical print quality. When scanning such a text, discrimination between confusable character geometries causes a nominal 5 percent character misrecognition rate.

In the prior art, apparatus for selecting the correct form of a garbled input word misread by an OCR has been limited to correcting errors in the substitution misrecognition mode. For improving the performance of an optical character reader, prior art discloses the use of conditional probabilities for simple substitution of one character for another or of character rejection, for calculating a total conditional probability that is input OCR word was misread, given that a predetermined dictionary word was actually scanned by the OCR. But the prior art deals only with the simple substitution of confusion pairs occupying the same corresponding location in the OCR word and in the dictionary word. The OCR word and the dictionary word must be of the same length.

A significant advance in the art of post processing error correction apparatus has been contributed by W. S. Rosenbaum, et al., in the copending patent application Ser. No. 600,743, filed July 30, 1975, as a continuation-in-part of application Ser. No. 459,820, filed Apr. 10, 1974, now abandoned, both applications being assigned to the same instant assignee. A regional context error correction apparatus is disclosed therein which corrects for segmentation errors as well as substitution errors in the characters read by the OCR. Segmentation misrecognition differs from that of simple substitution in that its independent events correspond to groupings of at least two characters. Nominally there are three types of segmentation errors. They are: horizontal splitting segmentation, concatenation segmentation and crowding segmentation. The underlying mechanical factor which these segmentation types have in common is that they are generated by the improper delination of the character beginning and ending points. Segmentation errors occur quite frequently in OCR output streams and constitute a substantial impediment to accuracy in text processing applications. The regional context error correction apparatus disclosed in patent application Ser. No. 600,743 contains a dictionary storage 28 shown in FIG. 3 containing words which are expected to be read by the OCR. It is disclosed that for general English Text Processing applications the words appearing in a conventional dictionary may be stored in the dictionary storage 28. It is seen however that the dictionary storage 28 would remain a substantial storage capacity to accommodate a conventional English dictionary and would require very fast accessing time in order to compare each word in the dictionary with the garbled word input from the OCR. The application also discloses that the dictionary store 28 may optionally have a bulk storage input 3 which could for example supply selected categories of reference words which are most likely to match with the particular type of misrecognized word received from the OCR.

Storage techniques of the associative memory type have been disclosed in the prior art for accessing the correct form of a misspelled word. For example, J. J. Giangardella, "Spelling Correction by Vector Representation Using a Digital Computer" IFEE Transactions on Engineering Writing and Speech, Volume EWS-10, Number 2, December 1967, page 57, discloses the use of vector representation of alpha words by assigning the numbers 1 through 26 to the letters A through Z respectively and calculating the vector magnitude and angle for accessing the word from a memory in a general purpose computer. Problems associated with this approach, which are typical of those confronting the prior art, relate to the associative memory accessing and over-inclusive or an under-inclusive class of words to correspond with the input word of interest.

OBJECTS OF THE INVENTION

It is an object of the invention to associatively access the class of valid alpha words as potential candidates for the correct form of a garbled alpha word, in an improved manner.

It is another object of the invention to associatively access a group of alpha words as potential candidates for the correct form of a garbled alpha word, the group accessed being less over-inclusive or under-inclusive than was possible in the prior art.

It is still another object of the invention to associatively access a group of valid alpha words as potential candidates for the correct form of a garbled alpha word misrecognized by an OCR machine, in an improved manner.

It is a further object of the invention to associatlvely access a group of spoken words represented by a sequence of phoneme characters as potential candidates for the correct form of a garbled spoken word as represented by a sequence of phoneme characters, in an improved manner.

It is an additional object of the invention to associatively access a group of words as potential candidates for the correct form of a word containing typographical errors commonly committed in the use of a keyboard, in an improved manner.

SUMMARY OF THE INVENTION

These and other objects of the invention are accomplished by the cluster storage apparatus disclosed herein. The cluster storage apparatus outputs groups of valid alpha words as potential candidates for the correct form of an alpha word misrecognized by a character recognition machine, a speech analyzer, or a standard keyboard. The cluster storage apparatus comprises a two-dimensional array of alpha word read only storage locations, each location having a group of alpha words arranged such that adjacent locations contain alpha words having similar character recognition misread propensities. A first-dimensional accessing means is connected to the read only storage for addressing the locations based upon the values assigned to the characters of which the input alpha word is composed. A second-dimensional accessing means is connected to the read only storage for accessing the location therein based upon the number of characters in the input alpha word. The read only storage memory is organized so as to minimize the difference in address between alpha words which have similar OCR misread propensities and so as to cluster words of a given character length, as well as words of other length that have a significant probability of being malsegmented into the given length. The propensity for misread is determined by empirical measurement of the OCR character transfer function. The transfer function is expressed as a series of equations representing each character's probability of being confused into a false output character. These equations are solved for the optimum character value set which assigns higher numeric values to highly reliable characters and lower numeric values to less reliable characters under a global constraint that characters that are misread related are assigned values within a maximal distance of one another. In addition the malsegmentation probability is determined by the OCR character transfer function. The transfer function of the OCR is expressed as a series of values representing the probability of a character being malsegmented. These values are used to calculate the probability of each word being malsegmented. The malsegmentation probability for a word is compared with a minimum threshold so that words whose malsegmentation propensity exceeds this threshold are stored with words of adjacent lengths. The cluster storage organization of the read only storage memory therefore has a structure which conforms with a global constraint such that no numeric assignment of two characters which can be misrecognized into one another will differ in location by more than a predetermined error interval. Thus an input alpha word which is potentially in error can be associated with that portion of the read only storage which contains potential candidates for the correct form of the input alpha word without excessive over-inclusion of extraneous alpha words or under-inclusive of significant alpha words.

DESCRIPTION OF THE DRAWINGS

The foregoing and other objects, features and advantages of the invention will be apparent from the following more particular description of the preferred embodiments of the invention, as illustrated in the accompanying drawings.

FIG. 3 is a schematic diagram showing the initial numeric assignment scheme of numerical values to alphabetical characters.

FIG. 4 is a schematic diagram of read only storage arrangement for the second-dimensional access.

DISCUSSION OF THE PREFERRED EMBODIMENT

Theory of Operation

Figure 1:
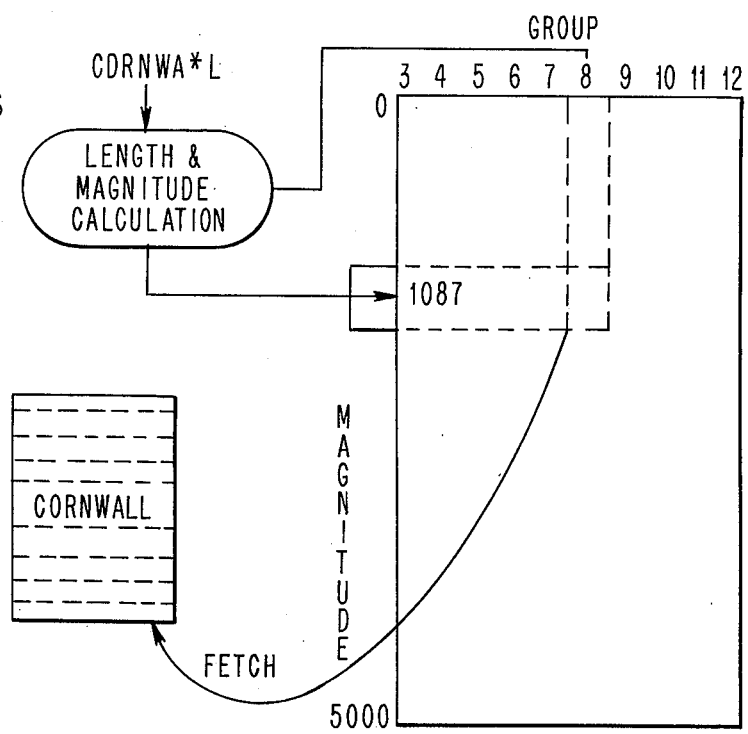
FIG. 1 is a schematic flow diagram of the vector fetch process.

The strategy used to effect OCR error correction is to reference an error correction dictionary and determine from all the words listed therein, "Which of the dictionary entries is the word that was scanned by the OCR and misrecognized into the incorrect form presently being processed?" Clearly, a basic part of this operation is the ability to determine which segment of the error correction dictionary should be reviewed. Schematically this is shown in FIG. 1. The more accurately one can delineate the portion of the dictionary which contains the correct form of the input word, the larger the dictionary can be without compromising the efficiency and speed of the OCR error correction operation.

When a garbled alpha word is detected in an output recognition stream and it is desired to select a group of candidate words for its correct form, the properties of OCR misread, makes it impossible to formulate a reliable dictionary accessing means using the normal dictionary indexing word attributes of character alphabetic properties and/or word length. The OCR misread propensities can alter either or both of the prereading word attributes in various ways. In spite of this, there is still much potential dictionary entry information in the misrecognized data. To utilize a garbled word as a key to the dictionary, the character string must be analyzed in a new perspective. The vehicles for this analysis are the Vector Fetch (VF) and Word Group file organization concepts.

The rationale which underlies the VF dictionary accessing methodology can best be understood as a specialized application of classical statistical confidence interval theory. As normally configured, an error interval sets up a range of values within which the true value of the factor being estimated can be said to lie with a predetermined error tolerance.

Within the perspective of the error interval analysis, the VF methodology can be configured as a specialized application which uses the garbled word data to:

a. Estimate the dictionary location of the word that was misrecognized by the OCR.

b. Give relevance to the estimated dictionary access point (DAP) by generating around it a range of locations wherein the required word information lies with a predetermined certainty.

The description of the mechanics involved in the implementing of the preceding dictionary fetch methodology is logically broken into two portions:
1. A first-dimension accessing means, based on character content, which requires
   a. Estimation of dictionary access point within the storage apparatus
   b. Determination of the fetch width constraints
2. A second-dimension accessing means which requires grouping of dictionary words within the storage apparatus to reflect similar length characteristics.

1.1 Estimation of Dictionary Access Point Within the Storage Apparatus

The dictionary access point (DAP) is the initial estimate of at what location the correct form of the OCR input word lies in the dictionary storage apparatus. The vehicle for this initial estimation process is a specialized hashing transformation applied to the misrecognized input alpha word. Underlying the hashing transformation is a specially developed numeric assignment scheme in which each character in the alphabet has a numeric value that reflects its absolute and relative OCR recognition reliability. The particulars of the alphameric assignment scheme will be elaborated upon shortly. It presently suffices to say that the numeric assigned is related to the reliability of the alpha character. In its simplest form, this implies that the more reliable an alpha character recognition, the more weight is put upon it in the hashing calculation.

Given this alphanumeric assignment scheme, the DAP follows as the summation of positive integers:

$$Y = \sum_{N=1}^{M} L_N \qquad (1)$$

where:
L = numeric value assigned to the character in the Nth position of the misrecognized word.
M = the number of character positions in the misrecognized word.

The key to this technique is the derivation of the appropriate alphameric assignment scheme. Dual and seemingly conflicting constraints have to be accommodated in the assignment scheme. Essentially, the alphameric assignment used to compute the DAP has to:
a. Minimize the effects on the DAP of intercharacter substitutions resulting from OCR misreads.
b. Map the dictionary words into a sufficiently uniform spread throughout the storage apparatus.

The first constraint reflects the desire that Equation (1), the hashing formulation, be as insensitive as possible to OCR substitution and segmentation misread. The second constraint seeks to avoid a trivial solution from evolving as a result of the first constraint. Such a solution will be the collapsing of the dictionary so that all entries occupy a single DAP or a very narrow band of DAPs within the storage apparatus. If this were the case, nearly the entire dictionary would be output in each fetch. For real time processing this would be an unacceptable situation and would defeat the intent of the vector fetch algorithm.

The optimum alphameric assignment scheme for the vector fetch can be derived by virtue of a mathematical approach using linear programming. This approach to vector fetch alphameric assignment scheme generation follows by expressing the OCR intercharacter substitution propensities as linear relations. This implies, for every non-null event in the OCR transfer function (confusion matrix), a norm distance is set up of the form:

$$|X_\alpha - X_\beta| \leq \text{Constant} \qquad (2)$$

where:
$X_\alpha, X_\beta$ are the numeric designates of the alphabetic characters denoted in the general case by $\alpha$ and $\beta$.

A typical OCR transfer function (confusion matrix) when reconstituted in the above form, yields several hundred separate expressions of the form of Equation (2). Standard linear optimization formulation, however, are not able to directly accommodate a norm distance (i.e., and absolute value relationship) as a base variable in the system of constraints or in its objective function.

To allow the programming optimization of the VF alphameric assignment scheme to reflect an analog to the OCR misread characteristics, a mixed integer linear programming formulation was adopted. Each relationship of the form of Equation (2), is reconstituted as a set of constraints of the form:

$$\begin{aligned} X_\alpha - X_\beta + 2KI_{\alpha\beta} + Z_{\alpha\beta} &\geq K \\ X_\alpha - X_\beta + 2KI_{\alpha\beta} - Z_{\alpha\beta} &\leq K \\ X_\alpha &\geq 0 \\ Z_{\alpha\beta} &\geq 0 \end{aligned} \qquad (3)$$

where:
$I_{\alpha\beta}$ represents the set of integer variables constrained to take on the value of either one or zero.
$Z_{\alpha\beta}$ is the variable over which the objective function optimization of the form $\Sigma P_{\alpha\beta} Z_{\alpha\beta} = $ min is performed. $P_{\alpha\beta}$ is relative weight or importance value associated with a respective constraint. In the present analysis $P_{\alpha\beta}$ has been set equal to the cumulative occurrence rate of the respective $\alpha, \beta$ characters.
K is the fetch error tolerance in units of magnitude.

Up to this point, the system of optimization equations has only taken into account constraints consistent with goal a above.

Goal b — the avoidance of inordinate degrees of clustering of dictionary entries in any range of magnitude values is accomplished by appending to the system of OCR misread equations (Equation 3) a series of constraints which maintain a somewhat uniform distribution of entries for all segments of the dictionary. These latter constraints are set up by randomly selected legal entries from the dictionary word list and specifying that a predetermined norm distance be maintained between them in the final dictionary vector structure. For example, the entries CORNWALL and SHERWOOD can be used to yield a vector dictionary infra-structure constraint of the form:

$$(X_C+X_O+X_R+X_N+X_W+X_A+X_L+X_L)-(X_S+X_H+X_E+X_R+X_W+X_O+X_O+X_D) \geq D_1$$
$$X_C+X_N+X_A+2X_L-X_S-X_H-X_E-X_O-X_D \geq D_1 \qquad (4)$$

The value of $D_1$ represents the norm distance between entries SHERWOOD and CORNWALL in a dictionary where an initial alphameric assignment scheme has been used which yields good dictionary word lists spread characteristics but does not necessarily meet all the OCR constraints as given by Equation (3). The programming array of constraints is completed by adding the additional infra-structure constraints consistent with the simple linear format described by the SHERWOOD, CORNWALL example described in the Equation (4).

The initial alphameric assignment scheme used to define the D values of Equation (4), was obtained by treating Equation (1), as a vector magnitude computation; that is, $$Y = \sum_{N=1}^{M} L_N^2$$

and assigning 1 through 26 ($L_N^2$ 1 through 676) to the characters in the alphabet.

Figure 2:
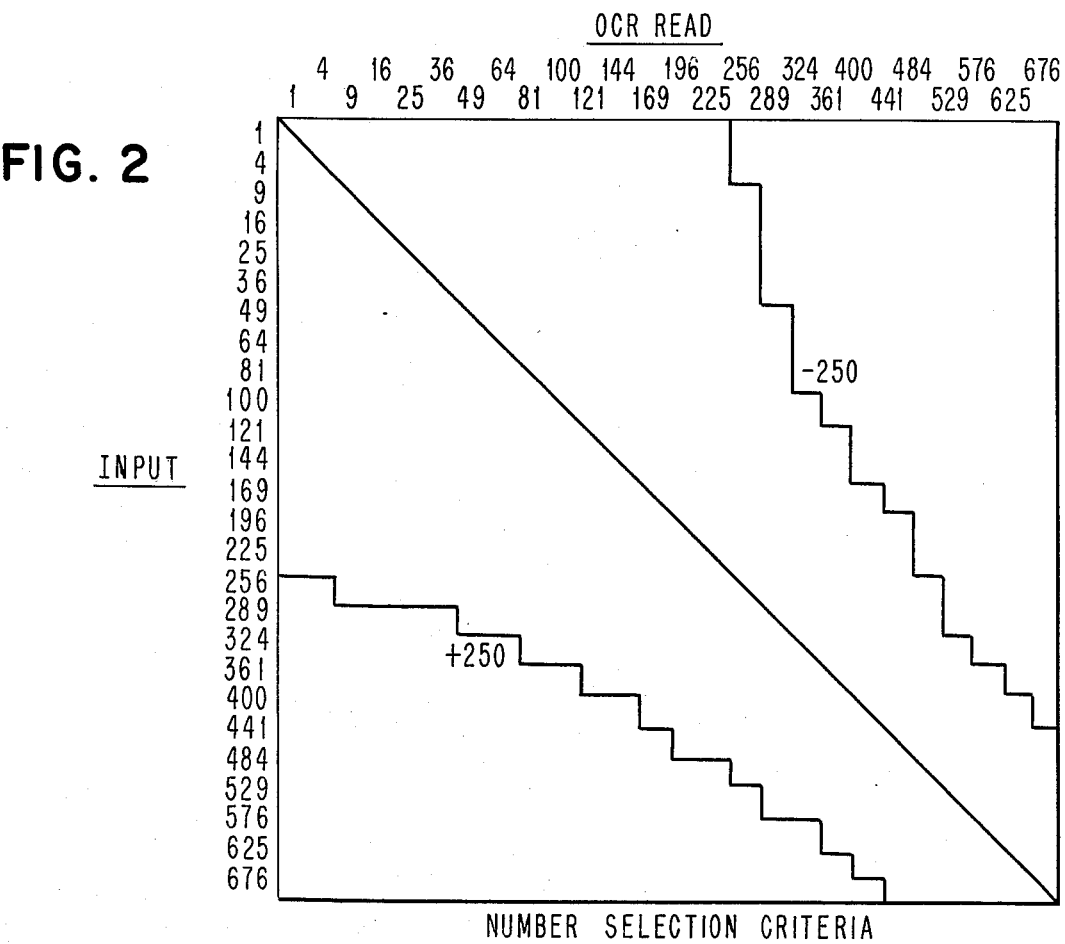
FIG. 2 shows the number selection criteria for the assignment of numerical values to alphabetical characters.

FIGS. 2 and 3 indicate how the numeric assignments are made in a manner that is consistent with that required by OCR misread magnitude distortion minimization constraints posed by Equations (3). If the numeric scale is to be 1 to 26, the squares of these values will range from 1 to 676. A matrix is shown for these values without specifying the character assignments. The vertical part of the matrix represents the input characteristics from the scanned document; the horizontal set represents the OCR recognition decision. All correct recognitions are indicated by the diagonal of the matrix. All substitutions or rejects are off the diagonal. For example, if an H and M, given values of 10 and 9 respectively, and if an H is misread as M, the difference of magnitude will be 100 minus 81 or 19. This would be an appropriate selection since H and M substitution is common.

If the OCR misread distortion is set at plus or minus 250 units (i.e., the normal value of the factor K on the right hand side of the system of equations generated from Equations (3)), then a relatively simple yet meaningful initial assignment of alpha characters to the numeric values indicated on the axes of the confusion matrix can be derived such that a large number of common recognition errors are contained within these plus or minus 250 unit error intervals. These boundaries are indicated in FIG. 2. The initial numeric assignment scheme is shown in FIG. 3, where the shaded portion of that figure has those misreads for which the initial scheme cannot compensate (the numbers within the matrix relate to the relative occurrence rate of the specific misread errors). Empirical analysis with this numbering scheme has shown that although it did not satisfy all constraints of the form of Equations (2), it did transform a word list into a suitable distributed dictionary which did not produce inordinate clustering of dictionary entries. For this reason, this numbering scheme was used to define the norm distance between the randomly selected entries used to formulate the dictionary infra-structure constraints as given by Equation (4). It should be noted that other numbering schemes could have been successfully used for the basis of these infra-structure constraints. The vector magnitude scheme was used because of its simplicity and familiarity.

The resulting formulation of Mixed Integer Linear Programming constraints and objective functions were solved using the facilities of IBM Mathematical Programming System Extended (MPSX) (MPS) Program Number 5734-XM4. Similar optimization routines are available from several other software sources. The final output of the programming solution yielded a set of alphameric assignments which minimized hashing distortions due to OCR misread, while maintaining a relatively uniform spread of entries over the dictionary. The alphameric assignment scheme is shown in Table 1.

TABLE 1

Final Fetch Vector Alphameric Assignment Scheme-
Values Generated Using Mixed Integer Linear Programming

| | | | | | | | | |
|---|---|---|---|---|---|---|---|---|
| A=200 | B=36 | C=256 | D=196 | E=144 | F=16 | G=289 | H=144 | I=64 |
| J=225 | K=441 | L=25 | M=175 | N=185 | O=225 | P=361 | Q=289 | R=225 |
| S=324 | T=121 | U=169 | V=100 | W=49 | X=529 | Y=9 | Z=484 | *=121 |

1.2 Determination of Fetch Width Constraints

If the misread word were transformed into a magnitude value using the alphameric assignment scheme shown in Table 1, then it could be assumed that the garbled and correct forms of the same word would map into fairly similar (close) magnitude values. If the correct form of each word had been stored in the error correction dictionary with respect to its magnitude, then the DAP yielded by Equation (1) would approach the vicinity of the correct word entry required for completion of error correction processing. However, to successfully perform the decision process which underlies the Regional Context Likelihood Error Correction Apparatus disclosed in copending patent application Ser. No. 600,743, it is a prerequisite that the misread form of the word be compared in a conditional probabilistic format with the correct version of that word. Hence, the DAP, in itself, is not sufficient for retrieving the data required for the latter phases of OCR error correction. However, the proximity of the DAP to the correct dictionary entry makes it a natural axis point for the construction of an error interval $\Delta$ which will act as the delimiter of a dictionary fetch range. If properly configured, the fetch range $\Delta$ will retrieve from locations adjacent to the DAP a set of address entries which will contain within it, with a predetermined error tolerance, the correct version of the misread input word. As in the preceding example, the selection of $\pm$ 250 as a fetch width $\Delta$ implies an error tolerance, i.e., the possibility of the correct version of the input word is outside the fetch range that was accessed.

The three major OCR misread errors which must be compensated for the construction of the dictionary fetch range are reject characters, substitution errors, and segmentation errors. The fetch is most effective for the reject and substitution errors. Segmentation errors are statistically less predictable and therefore not as readily overcome. A misread word can become unretrievable using the VF if successive misreads within the word additively reinforce one another until a delta magnitude greater than 250 is achieved. This situation is comparatively rare in that successive misreads will tend to randomly cancel, to some degree, the magnitude of the deviation that each has respectively added.

1.3 Word Length Grouping Within the Storage Apparatus

Organization of dictionary structure according to word length similarities is used to complement the accessing potential of the VF methodology.

FIG. 1 shows a schematic of the fetch process for the misrecognized input word. The magnitude of the input word is calculated using Equation (1). For the word shown in this is 1087. The word length is also used to reduce the number of entries in the fetch. For OCR data, length cannot be used as an absolute discriminant, since segmentation errors may artificially increase or decrease the word length. A common approach to this problem is to include not only words of the same length in the fetch as the input word, but also all words of adjacent length and even those that differ by as much as two positions. This is done according to the set of rules which themselves are length-dependent. The problem with this approach is that it leads to unacceptable large fetch sizes. (on the average, approximately 20 percent of the dictionary)

It is again possible to utilize known OCR error propensities to improve the word length discriminant. Since word length changes are caused by some type of segmentation problem (splitting or concatenation), only the words that are prone to be malsegmented by virtue of their composition are entered in more than one of the word length subdivision. This leads to the concept of a Word Group discriminant. In a Word Group, all words of the designated length are included as well as words of all other lengths that have a significant probability of being malsegmented to that length.

The implementation of Word Group accessing is dependent on determination of objective criteria by virtue of which a word's character composition may be evaluated for assessment of the degree of missegmentation propensity and accordingly the requirement for multiple Word Group entry. To allow assessment of a dictionary word for inclusion in a Word Group, the following segmentation threshold calculation is performed.

The probability of word segmentation is described functionally by Equation (5).

$$P(Word_{seg}) = 1 - P(Word_{\overline{seg}}) = 1 - P(W_{\overline{seg}}) \quad (5)$$

where bar notations indicates the complement of the segmentation event, that is, no segmentation occurrence. From empirical data averaged over all word lengths, 80% of all segmentation will occur in words whose $P(W_{seg})$ is greater than 0.6%. It would be reasonable, therefore, to take as a threshold for Word Group duplicative entry, any word whose cumulative character segmentation probability surpasses this nominal value or, in other words:

$$P(W_{seg}) > T = 0.6\% \quad (6)$$

of course this threshold could be lowered more but this would add many more duplicative entries while not accommodating significant additional word segmentations. The relationship in Equation (5) can be made more meaningful by posing it in terms of constituent character events as:

$$P(W_{seg}) = 1 - P(\alpha 1_{\overline{seg}}) \cdot P(\alpha 2_{\overline{seg}}) \ldots P(\alpha N_{\overline{seg}}) \quad (7)$$

substituting Equation (7) in Equation (6) results in $$1 - P(\alpha 1_{\overline{seg}}) \cdot P(\alpha 2_{\overline{seg}}) \ldots P(\alpha N_{\overline{seg}}) > T$$

or $$P(\alpha 1_{\overline{seg}}) \ldots P(\alpha 2_{\overline{seg}}) \ldots P(\alpha N_{\overline{seg}}) < 1 - T$$

In terms of logs this finally results in a general threshold relationship for Word Group candidacy of:

$$|\log P(\alpha 1_{\overline{seg}}) + \log P(\alpha 2_{\overline{seg}}) + \ldots \log P(\alpha n_{\overline{seg}})| > \log (1-T) \quad (8)$$

By relating Equation (8) back to the binomial model which underlies its application, we can readily solve for the level of malsegmentation propensity (probability) that will make a word candidate for duplicative entry in one word group, two word groups etc. This is performed as follows:

Threshold for one segmentation event:

$$\sum_{J=1}^{M} |\text{Log } P(\alpha j_{\overline{seg}})| > |\log (1-T)| \quad (9)$$

where M = number of characters in a word.

Threshold for two segmentation events:

$$P(W_{seg}2) = C_2^M \overline{P}^2(\alpha_{seg}) \overline{P}^{(M-2)}(\alpha_{\overline{seg}}) = \frac{M!}{2!(M-2)!}(1-\overline{P}(\alpha_{\overline{seg}}))^2 \overline{P}^{(M-2)}(\alpha_{\overline{seg}})$$

where $\overline{P}(\alpha_{seg})$ is the average character malsegmentation propensity for the word.

Hence the word malsegmentation threshold for a dictionary entry to be entered in two adjacent Word Groups becomes $$-P(W_{seq} 2) = \frac{M!}{2!(M-2)!}(1-\overline{P}(\alpha_{\overline{seg}}))^2 > T$$

For instance, for words of length, 8, (M=8), this can be put in convenient computational form as $$|\log P(\alpha_{\overline{seg}})| > |\log (1 - \sqrt{T(2!)(6!)/8!}|$$

Similar analytical procedures can be applied to yield the complete spectrum of Word Group Thresholds (i.e. for single entry, double entry, triple entry, etc., for each respective word length.)

In a Word Group using the previously derived malsegmentation propensity thresholds all words of the designated length are included, as well as words of other lengths that have a significant probability of being malsegmented to that length. Therefore, a single word may appear in several word groups, based on its character composition. For example, in FIG. 4, the word CORNWALL appears in Word Group 8, its correct length. CORNWALL, however, has four characters that are prone to splitting segmentation (one character segmented into two). These are C, O, N, and W.

It has been determined that there is a significant probability of CORNWALL being misread as a nine-character word, such as, CORNVVALL, or a ten-character word such as CIJRNVVALL. Therefore, the word is also included in Word Groups 9 and 10. Similarly, WHITEHALL is initially in Word Group 9. However, it is also included in Word Group 8 because it has two character pairs, either of which are likely to concatenate into single character. These are HI and LL.

In resume, the second dimension of the storage apparatus will take the form of autonomous word groups based on alpha-field length. This implies that all N character dictionary entries will be listed together where N=1, 2, 3 ... up to the longest set of dictionary words being considered. Appended to each of these dictionary entry groups will be dictionary words of a different length but whose alphabetic composition makes their segmentation propensity exceed a threshold and therefore, likely candidates for OCR-length distortion effects.

The number of entries in the resultant fetch produced by using both the magnitude and word length group discriminants has been shown in simulation to yield a fetch of between 1 and 2 percent of the number of unique entries in the total dictionary. This reduction in fetch size is achieved while causing only a small decrease in fetch accuracy.

Keyboard Error Correction

The binary reference matrix 12, cluster storage 22 and regional context apparatus 22 perform post processing functions thru their ability to qualify the error (misread) mechanism being addressed in terms of a confusion matrix of events. The techniques that have been successfully applied to OCR error correction are similarly useful for any other system wherein confusion matrices can be compiled.

The error characteristics related to typewriter keyboard have been extensively studied and qualified. Data concerning over 6,000,000 key strokes have been compiled and partially reduced. Table 2 shows a confusion matrix resulting from the examination of slightly over 1,000,000 key strokes.

Examination of the events in Table 2 show that the error patterns on keyboard substitution misstroke error fall into three main categories:

1. Visually confusiable characters (e.g., 1, $l$; $m$, $n$; etc.)
2. Adjacent keys (key juxtaposition)
3. Same finger position on other hand.

The above error mechanism, even more than in OCR, underlie a stable time invariant process which can be meaningfully qualified in confusion matrix format.

Visually comparing the event dispersion between the Figures, it is clear that keyboard error patterns are more predictable (i.e., have less options) than those related to OCR. It can be shown, by appealing to an entropy model of our post processing system, the less the dispersion of events in the confusion matrices, the greater the error correction potential of the system.

TABLE 2

| IN-TENDED KEY | A | B | C | D | E | F | G | H | I | J | K | L | M | N | O | P |
|---|---|---|---|---|---|---|---|---|---|---|---|---|---|---|---|---|
| A |   | 4 |   | 2 |   |   |   |   |   |   |   |   |   |   | 3 |   |
| B |   | 1 |   |   | 2 | 3 |   |   |   |   |   |   |   |   |   | 1 |
| C |   |   |   | 4 |   |   |   | 1 |   |   |   |   |   |   |   |   |
| D |   | 2 |   |   | 2 | 1 | 1 |   |   |   | 1 | 2 |   |   | 2 |   |
| E | 2 |   |   |   |   |   | 2 | 4 | 6 |   |   |   |   |   | 1 |   |
| F |   | 2 |   | 2 | 1 |   | 1 |   |   |   |   |   |   |   |   |   |
| G |   | 2 |   | 1 |   | 1 |   |   |   |   |   |   |   |   |   |   |
| H |   | 1 |   |   |   |   |   |   |   |   | 1 | 1 |   |   |   |   |
| I |   |   |   |   |   |   |   |   | 1 |   |   | 2 |   |   | 6 | 1 |
| J |   |   |   |   |   |   |   |   |   |   |   |   |   |   |   |   |
| K |   | 3 |   |   |   |   |   | 1 |   |   |   | 2 |   |   |   |   |
| L |   |   |   | 1 |   |   |   |   | 1 |   |   |   |   |   | 2 |   |
| M | 1 | 4 |   | 1 |   |   |   |   |   |   |   |   |   |   | 7 | 3 |
| N |   | 4 |   | 1 |   | 1 | 2 |   |   |   |   |   | 1 |   |   |   |
| O | 1 |   |   | 3 |   |   | 2 | 5 |   |   |   | 3 |   |   |   | 4 |
| P |   |   |   |   |   |   |   |   |   |   |   |   |   |   |   |   |
| Q |   |   |   |   | 4 |   |   |   |   |   |   |   |   |   |   |   |
| R | 1 |   | 2 |   | 1 | 5 | 1 |   |   |   | 1 |   |   |   |   |   |
| S | 2 |   | 2 | 4 |   | 1 |   | 2 |   |   | 1 |   | 1 | 1 |   |   |
| T |   | 2 |   |   |   |   | 1 | 3 |   |   |   | 1 |   |   |   |   |
| U |   |   |   |   | 2 | 1 |   |   | 5 |   |   |   |   |   |   |   |
| V | 3 |   | 1 |   |   |   |   |   |   |   |   |   |   |   |   |   |
| W |   |   |   |   | 4 |   |   | 1 |   |   |   |   |   |   |   |   |
| X |   |   |   |   |   |   |   |   |   |   |   |   |   |   |   |   |
| Y |   |   |   |   | 1 |   |   | 6 | 1 |   |   |   |   |   | 1 |   |
| Z |   |   |   |   |   |   |   |   |   |   |   |   |   |   |   |   |
| , |   |   |   |   |   |   |   |   |   |   |   |   |   |   |   |   |
| . |   |   |   |   |   |   |   |   |   |   |   | 1 |   | 1 |   |   |
| x |   |   |   |   |   |   |   |   |   |   |   |   |   |   |   |   |

| IN-TENDED KEY | Q | R | S | T | U | V | W | X | Y | Z | -, | . | + | ; | ( | TOTAL |
|---|---|---|---|---|---|---|---|---|---|---|---|---|---|---|---|---|
| A | 2 |   | 2 |   |   |   | 2 | 2 |   |   |   |   |   |   |   | 17 |
| B |   |   |   |   |   |   |   |   |   |   |   |   |   |   |   | 7 |
| C |   |   | 2 |   | 1 |   |   | 1 |   |   |   |   |   |   |   | 9 |
| D |   | 3 | 7 |   | 1 | 1 |   |   |   |   |   |   |   |   |   | 23 |
| E |   | 5 | 6 |   |   |   | 6 |   | 1 |   |   |   |   |   |   | 33 |
| F |   | 2 |   |   |   |   |   |   |   |   |   |   |   |   |   | 8 |
| G |   |   | 2 |   |   |   |   |   |   |   |   |   |   |   |   | 6 |
| H |   |   |   | 4 |   |   |   |   |   |   |   |   |   |   |   | 7 |
| I |   |   |   |   | 3 |   |   |   |   |   |   |   |   |   |   | 13 |
| J |   |   |   |   |   |   |   |   |   |   |   |   |   |   |   | 0 |

TABLE 2-continued

```
K                                           6
L                                           4
M      1     1 1                 1         20
N      2                         2         13
O      1        1                1         21
P         2                                 2
Q                                1          5
R      2  4                ...1   1         19
S         1     5  1                       21
T      6  1                                14
U      1  1              1                 11
V                                           4
W            2           2       1         10
X                                           0
Y         2     1  1             1         14
Z                                           0
-                                           0
'                       13                 13
.                 5                         7
x                 2     2                   4
```

It follows that a given level of error correction capability attained on OCR using the preceding techniques can be at least equaled if not surpassed by using the same techniques on keyboard.

Keyboard Vector Dictionary

The keyboard vector dictionary serves the same purpose in keyboard error correction as the cluster storage 22 does in OCR Error Correction. It allows a word containing misstroke errors to be associated with the segment of the error correction dictionary (wordlist) wherein, among other entries, the correct version of the misstroke garbled word lies. Presently, for OCR purposes, this Vector Fetch procedure yields an average fetch size of about 1 percent of the word list. By the nature of the sparsity of the keystroke confusion matrix Table 2 even greater discriminant potential exists in a Vector Dictionary built to reflect the keystroke confusion matrix.

Figure 6:
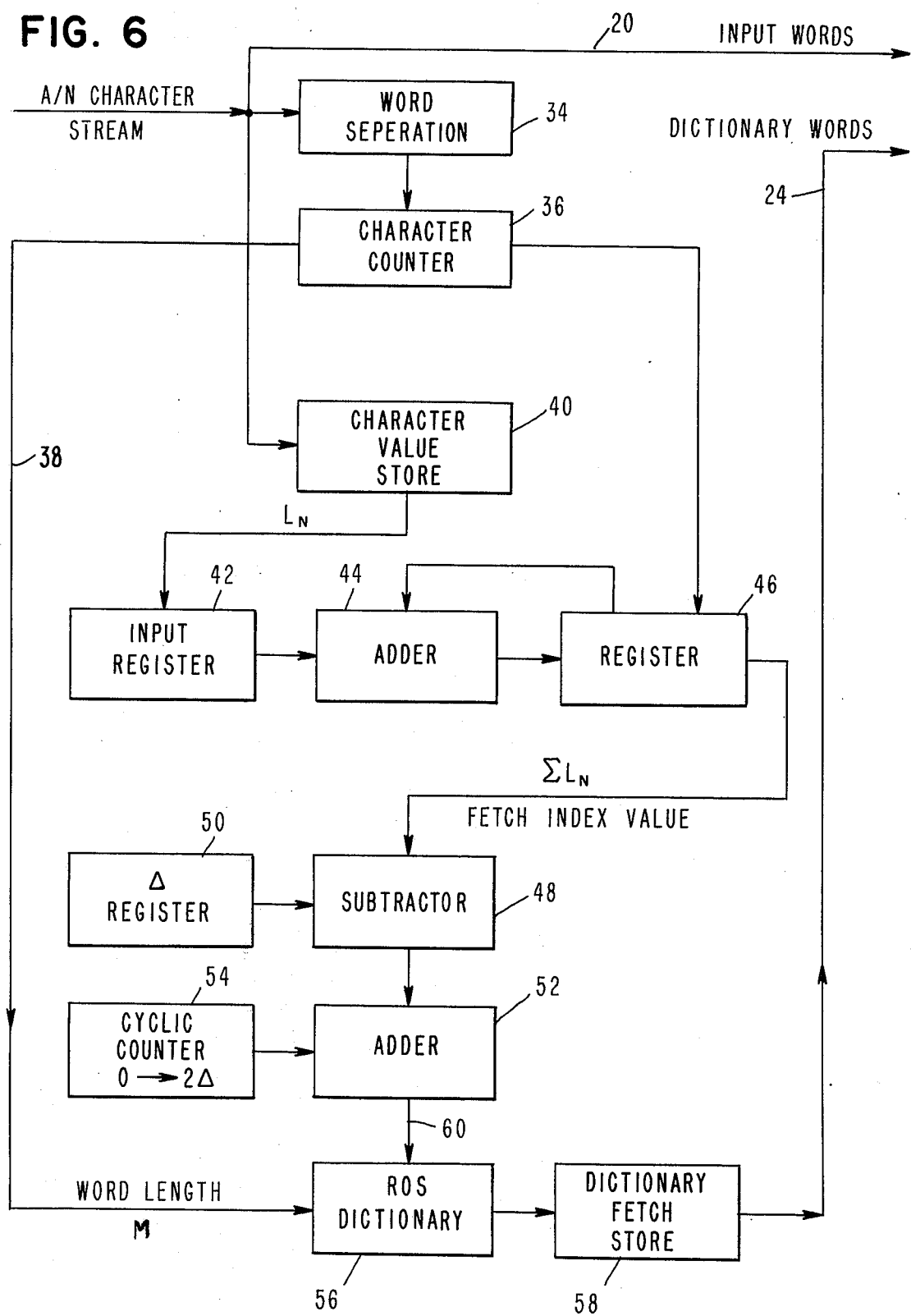
FIG. 6 is a detailed block diagram of the cluster storage apparatus invention.

Due to the highly analogous nature of the keystroke and OCR error from the confusion matrix standpoint, the existing apparatus shown in FIG. 6 is directly useable with the ROS 56, of course, restructured to store cluster of similarly mistyped alpha words. This requires generating the linear program analog of the inter-character confusions by which the optimal alphanumeric equivalencing scheme is derived.

Maximum Likelihood Misstroke Error Correction (MLMC)

The MLMC performs the same function as the regional context maximum likelihood apparatus 26.

The MLMC addresses correction of the four dominant categories of keyboard error. They are character:
o substitution
o transposition
o addition
o deletion

Character Substitution

Substitution due to misstroke appears to be the most common keyboard error type. The OCR substitution error correction techniques in RCML can be used without modification to effect alpha substitution correction MLMC. All that is required is a data readin of new keyboard confusion statistics.

Character Transposition

Character Transposition

Character Transposition error relates to the reversal of the correct sequence of occurrence of two otherwise correct characters. The spelling "Recieve" is an example of transposition error. This type of error is not related to OCR garbling, and hence not treated in RCML. However, the progression of operations from vector fetch cluster storage apparatus through MLMC yields an easily implemented method for affecting character transposition error correction.

Correction of transposition errors follow by use of vector magnitude as a special entry flag in the MLMC process. The vector magnitude of a transposition garbled word is the same as that of the original form of the word. Hence those words in the dictionary fetch for cluster storage 22 which have the same magnitude as the garbled word become candidate for character transposition error correction. The basic transposition error correction technique evoked for this special (i.e., garbled word magnitude=dictionary word magnitude) subset of entries in the fetch involves switching the character juxtaposition when impossible mismatch events are encountered between the garbled word and a dictionary word with the same magnitude value.

Character Addition/Deletion

The error mechanism which governs character addition and deletion on keyboard appears to be strongly correlated to the diagram being typed. If the diagram is normally part of a very common trigram, inadvertantly the trigram may be typed resulting in the addition of the spurious character. For example, the typing of the diagram th often results in spurious addition of e yielding the when only th was called for. Conversely, character deletion seems to be highly correlated to the typing of infrequent trigrams which however contain a common diagram. In transcription, the trigram may be aliased as its shorter, more common diagram constituent.

Addition and deletion are highly governed by the above diagram/trigram mechanisms and their correction can be achieved in MLMC by relatively minor modification to the present RCML segmentation and concatenation error correction logic.

POST PROCESSING ERROR CORRECTION SYSTEM

Figure 7:
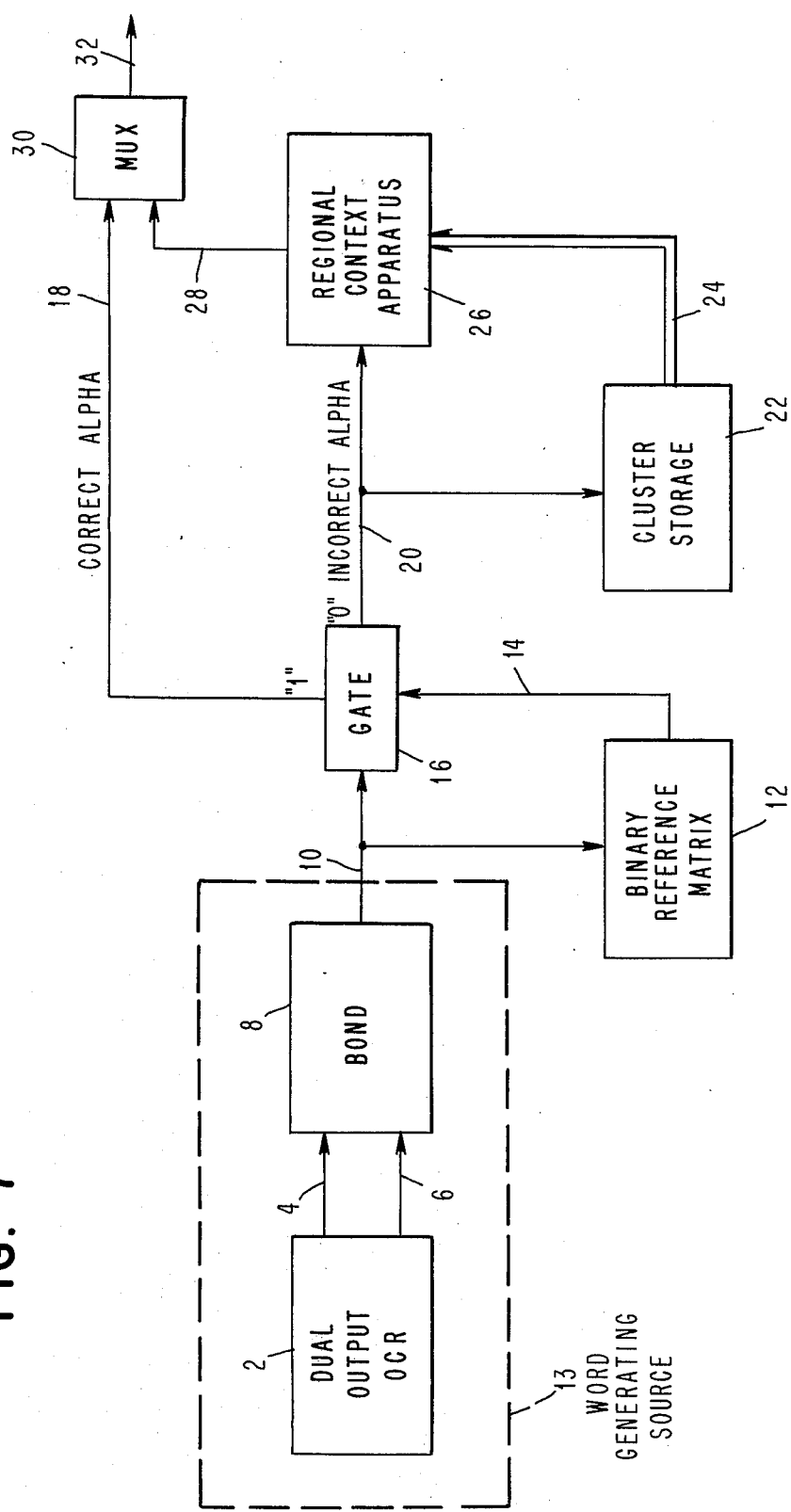
FIG. 7 is a general block diagram of the post processing, error correction system containing the Bavesian Online Numeric Discriminator, Ser. No. 409,526, filed Oct. 25, 1973, now U.S. Pat. No. 3,842,402, issued Oct. 15, 1974 the Binary Reference Matrix Apparatus, Ser. No. 494,251, filed Aug. 2, 1974, now U.S. Pat. No. 3,925,761, issued Dec. 9, 1975 the Regional Context Maximum Likelihood Bavesian Error Correction Apparatus, Ser. No. 600,743, filed July 30, 1975 as a continuation-in-part of application Ser. No. 459,820, filed Apr. 10, 1974, now abandoned, and the Cluster Storage Apparatus disclosed herein.

FIG. 7 shows a general block diagram of a post processing, error correction system for generating the most likely form of an input alpha word garbled by a word generating source 13. Word generating source 13 is a generalized apparatus which can comprise either an optical character recognition machine, a speech analyzer generating phoneme characters, or a conventional keyboard apparatus. Each of these specific types of word generating source has the common characteristic that in combination, alpha words output therefrom have certain characteristics error propensities which can be characterized by a character transfer function. A specific word generating source namely an optical character recognition machine is shown in FIG. 7, however a speech analyzer generating phoneme character output or a conventional keyboard generating alpha numeric output could be substituted therefore.

Shown specifically in FIG. 7, is the Bayesian Online Numeric Discriminator disclosed in U.S. patent application Ser. No. 409,526 filed Oct. 25, 1973, by W. S. Rosenbaum, et al., now U.S. Pat. No. 3,842,402 assigned to the instant assignee, and hereby incorporated herein by reference, which accepts input from a dual output optical character recognition machine 2. The bayesian online numeric discriminator 8 outputs alpha numeric characters over line 10 to the binary reference matrix 12 which is described in U.S. patent application Ser. No. 494,251, filed Aug. 2, 1972 by W. S. Rosenbaum, et al., now U.S. Pat. No. 3,925,761 assigned and hereby incorporated herein by reference to the instant assignee. The input line 10 corresponds to the input line 2 shown in FIG. 4 of the binary reference matrix patent. In addition, the line 10 is connected to the gate 16 having a control input from the binary reference matrix 12 over line 14. Line 14 corresponds to line 44 in the binary reference matrix application. The bayesian online numeric discriminator 8 discriminates numeric character fields from alpha character fields in the output recognition stream from the optical character reader 2. The alpha recognition stream is input to the binary reference matrix over line 10 to detect valid alpha words and invalid alpha words. Valid alpha words are conducted by gate 16 from line 10 to 18 by means of the control line 14 from the binary reference matrix 12. If the input alpha word over line 10 is detected as invalid by the binary reference matrix 12, the control line 14 causes the gate 16 to direct the alpha word on line 10 to the output line 20 which is input to the cluster storage apparatus 22 which is disclosed in the instant application. The cluster storage apparatus 22 accesses from the read only storage associative memory therein, a group of correct alpha words which have some probability of having been confused with the invalid alpha word of interest input on line 20. This group of potentially correct alpha words is input over line 24 to the regional context maximum likelihood bayesian error correction apparatus 26 which is disclosed in U.S. patent application Ser. No. 600,743, filed July 30, 1975, by W. S. Rosenbaum, et al., assigned to the instant assignee and hereby incorporated herein by reference, said application being a continuation-in-part of application Ser. No. 459,820, filed Apr. 10, 1974 to W. S. Rosenbaum, et al., now abandoned. The input line 24 corresponds to the input line 3 in FIG. 3 of the regional context application which is input to the dictionary storage 28 therein. The incorrect alpha word 20 is input over line 20 to the regional context apparatus over the line number 2 disclosed in that application. The invalid alpha word is then processed in the regional context apparatus, where a conditional probability analysis is executed to determine which word from the correct words which were input over line 24, most closely corresponds to the invalid alpha word output by the OCR. The correct alpha word from the regional context apparatus is output over line 28 which corresponds to line 10 of the regional context application, to the multiplex 3 which in turn outputs the correct alpha word on output line 32 as the best guess alpha word for the garbled word input from the OCR 2.

DESCRIPTION OF THE CLUSTER STORAGE APPARATUS

A fundamental concept underlying the cluster storage memory apparatus is the physical relationship of words stored in the read only storage memory to the character transfer function of the character recognition machine or keyboard whose output is being analyzed. The cluster storage memory is an associative memory, the position of the data entry point in the memory being determined by the characteristics of the garbled input word itself. These characteristics of the input word are the word group and the index value.

Figure 5:
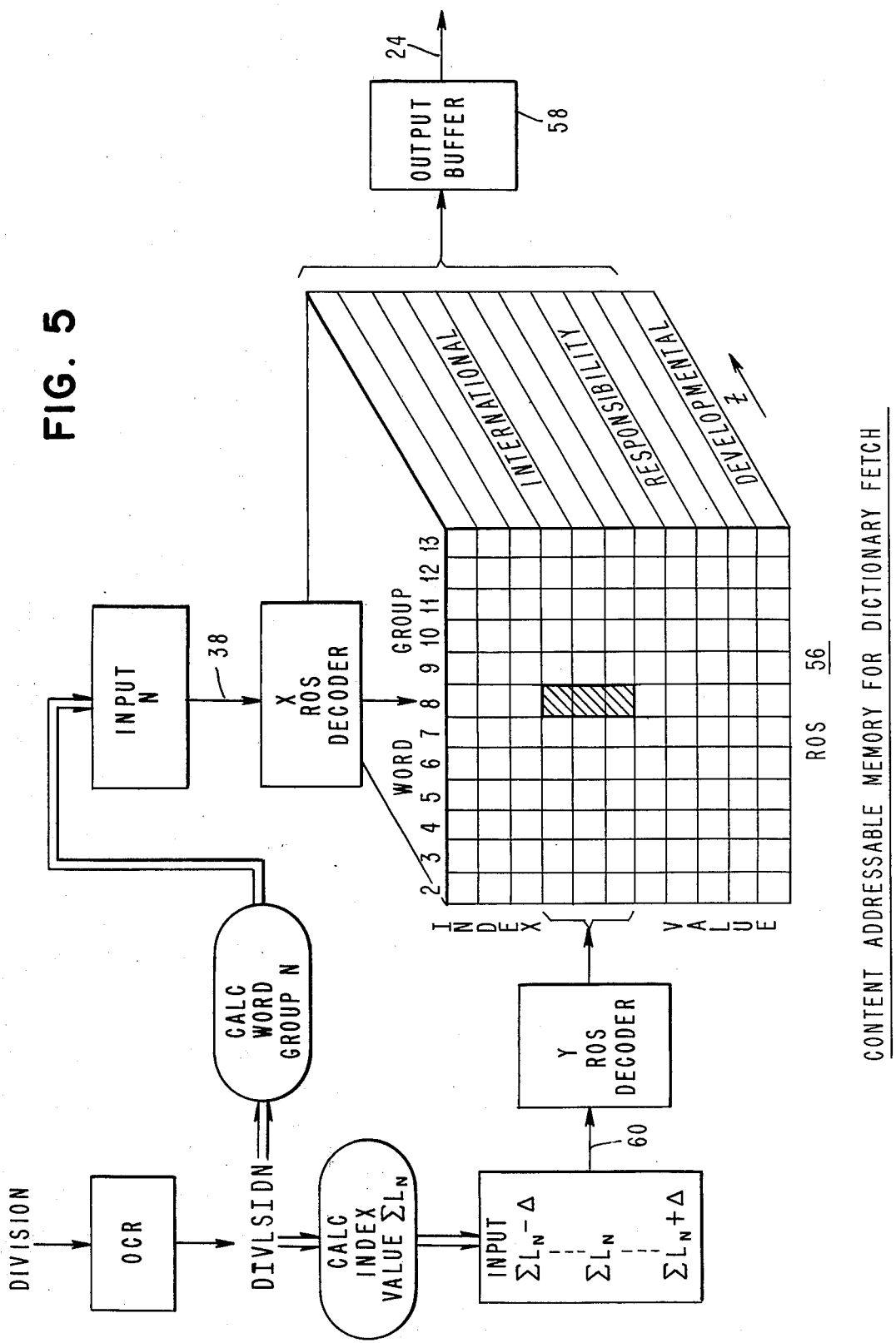
FIG. 5 is a schematic diagram of the read only storage memory.

As is shown in the data flow diagram of FIG. 5, word group is used as the X access address and the index value is used as the Y access address for the read only storage. Selection of a word group and an index value result in the transfer of a dictionary word as a Z axis datum for each value of Y of between the index value $-\Delta$ and the index value $+\Delta$. This cluster of $2\Delta + 1$ dictionary word constitutes the group accessed for further use in the regional context maximum likelihood bayesian error correction apparatus mentioned above.

The data flow diagram of FIG. 5 shows, schematically, an arrangement of dictionary words in the read only storage. Twelve word groups are included on the X axis representing word lengths of two through thirteen characters. The selection of a word group is determined by the length of the input garbled word. As was mentioned above, not all of the dictionary words in a given word group have the same number of characters. The words in the $n$th group share the common characteristic that the character recognition machine has an appreciable probability of outputting such words with $n$ characters. This would include all words of the length $n$ and also those that the character recognition machine is likely to segment into $n$ characters. This arrangement results in multiple entries of some words into different word groups.

Each input garbled word gives rise to $2\Delta + 1$ accesses of the read only storage. The value of the index is determined from the character content of the input word. The range $\Delta$ is fixed and represents the cofidence interval where there is a high probability of finding the correct entry. A given alpha word inputs from the character recognition machine will result in the output of a range of $2\Delta$ magnitude word assignments corresponding to words from the group stored in the read only storage 56, which both will be output to the output buffer 58.

The detail block diagram of the cluster storage apparatus is shown in FIG. 6. A misrecognized alpha word is input from the character recognition machine over line 20. The separation detector 34 detects the beginning and end points for each word. The character counter 36 connected to the word separation detector 34 counts the number of characters in an input alpha word and outputs that number as the value M over line 38 as the second-dimension access value to the read only storage 56. The misrecognized alpha word input over line 20 is also directed to the character value store 40 which has stored therein the character values $L_N$ shown in Table 1. Each character in the input alpha word is used to access the corresponding character value $L_N$ which is output to the input register 42. The input register 42, the adder 44 and the register 46 serve to accumulate the sum of the values $L_N$ for the characters in the misrecognized alpha word inputs over line 20 from the character recognition machine. When the word separation detector 34 detects the end of the alpha word input over line 20, the signal is output from the character counter 36 to the register 46 outputting the final sum of the values $L_n$ as the median fetch index value, to the subtractor 48. The delta register 50 contains the value $\Delta$ which, for the character values shown in Table 1, equals 250. The value of $\Delta$ is output from the delta register 50 to the subtractor 48 and is subtracted from the median fetch index value which is input from the register 46, yielding the minimum value the fetch index which constitutes the first-dimension accessing value input to the read only storage 56. This minimum fetch index value is output to the adder 52 as the addend and the output from the cyclic counter 54 is input to the adder 52 as the augend, the sum output of which is the first-dimensional accessing address for the read only storage 56. The cyclic counter 54 sequentially outputs integer values from 0 to $2 \times \Delta$ to the adder 52, thereby causing the quantity of $2\Delta + 1$ accesses of the read only storage 56. The cluster of $2\Delta + 1$ candidate words stored in the read only storage 56 are output to the dictionary fetch store 58 and then over the output line 24 for further utilization. As used by the regional context error correction apparatus disclosed in U.S. patent application Ser. No. 600,473 heretofore referenced, the output line 24 is connected to the regional context apparatus input line 3 to the dictionary storage 28.

While the invention has been particularly described with reference to the preferred embodiments thereof, it will be understood by those of skill in the art that the foregoing and other changes in form and detail may be made therein without departing from the spirit and scope of the invention.

We claim:

1. A cluster storage apparatus for outputting groups of valid alpha words as potential candidates for the correct form of an alpha word misrecognized by an OCR machine, comprising:
    a two-dimenational array of alpha word read only storage locations, each location having a group of alpha words arranged such that adjacent locations contain alpha words having similar OCR misread propensities;
    means for assigning numeric values to the characters of the input alpha word based upon the read reliability of the characters;
    a first-dimensional accessing means for addressing said locations based upon the values assigned to the characters of which the input alpha word is composed;
    a second-dimensional accessing means for accessing said locations based upon the number of characters in said input alpha word;
    said first-dimensional accessing means calculating the first-dimensional address as a magnitude $$Y = \sum_{N=1}^{M} L_N$$

where $L_N$ is the numeric value assigned to each alpha character;
    whereby an input alpha word which is potentially in error can be associated with that portion of the read only storage which contains potential candidates for the correct form of the input alpha word.

2. The cluster storage apparatus of claim 1, which further comprises:
    said cluster storage being organized so as to minimize the difference in address between alpha words which have similar OCR misread propensities and so as to cluster words of a given character length, as well as words of other lengths that have a significant probability of being malsegmented into said given length;
    said propensity being determined by empirical measurement of the OCR character transfer function;
    said transfer function being expressed as a series of equations representing each character's probability of being confused into a false output character;
    said equations being solved for the optimum character value set which assigns higher numeric values to highly reliable characters and higher numeric values to characters which occur more frequently and lower numeric values to less reliable characters and lower numeric values to characters which occur less frequently;
    said malsegmentation probability being determined by the OCR character transfer function;
    said transfer function being expressed as a series of values representing the probability of a character being malsegmented;
    said values being used to calculate the probability of each word being malsegmented;
    said word malsegmentation probability being compared with a minimum threshold so that words whose malsegmentation propensity exceeds this threshold are stored with words of adjacent lengths;
    whereby said cluster storage is organized in light of a global constraint so that no numeric assignment of two characters which can be misrecognized into one another will differ in location by more than a predetermined error interval.

3. A cluster storage apparatus for outputting groups of valid phoneme words as potential candidates for the correct form of a phoneme word misrecognized by speech analyzer machine, comprising:
    a two-dimensional array of phoneme word read only storage locations, each location having a group of phoneme words arranged such that adjacent locations contain phoneme words having similar speech analyzer misread propensities;
    means for assigning numeric values to the characters of the input phoneme word based upon the read reliability of the characters;
    a first-dimensional accessing means for addressing said locations based upon the values assigned to the characters of which the input phoneme word is composed;
    a second-dimensional accessing means for accessing said locations based upon the number of characters in said input phoneme word;

said first-dimensional accessing means calculating the first-dimensional address as a magnitude $$Y = \sum_{N=1}^{M} L_N$$

where $L_N$ is the numeric value assigned to each phoneme character;

whereby an input phoneme word which is potentially in error can be associated with that portion of the read only storage which contains potential candidates for the correct form of the input phoneme word.

4. The cluster storage apparatus of claim 1, which further comprises:

said cluster storage being organized so as to minimize the difference in address between phoneme words which have similar speech analyzer misread propensities and so as to cluster words of a given character length, as well as words of other lengths that have a significant probability of being malsegmented into said given length;

said propensity being determined by empirical measurement of the speech analyzer transfer function;

said transfer function being expressed as a series of equations representing each characters probability of being confused into a false output character;

said equations being solved for the optimum character value set which assigns higher numeric values to highly reliable characters and higher numeric values to characters which occur more frequently and lower numeric values to less reliable characters and lower numeric values to characters which occur less frequently;

said malsegmentation probability being determined by the speech analyzer character transfer function;

said transfer function being expressed as a series of values representing the probability of a character being malsegmented;

said values being used to calculate the probability of each phoneme word being malsegmented;

said word malsegmentation probability being compared with a minimum threshold so that words whose malsegmentation propensity exceeds this threshold are stored with words of adjacent lengths;

whereby said cluster storage is organized in light of a global constraint so that no numeric assignment of two characters which can be misrecognized into one another will differ in location by more than a predetermined error interval.

5. A cluster storage apparatus for outputting groups of valid alpha words as potential candidates for the correct form of an alpha word mistyped on a keyboard machine, comprising:

a two-dimensional array of alpha word read only storage locations, each location having a group of alpha words arranged such that adjacent locations contain alpha words having similar keyboard typographical error propensities;

means for assigning numeric values to the characters of the input alpha word based upon the typographical error propensity of the characters;

a first-dimensional accessing means for addressing said locations based upon the values assigned to the characters of which the input alpha word is composed;

a second-dimensional accessing means for accessing said locations based upon the number of characters in said input alpha word;

said first-dimensional accessing means calculating the first-dimensional address as a magnitude $$Y = \sum_{N=1}^{M} L_N$$

where $L_N$ is the numeric value assigned to each alpha character;

whereby an input alpha word which is potentially in error can be associated with that portion of the read only storage which contains potential candidates for the correct form of the input alpha word.

6. The cluster storage apparatus of claim 1, which further comprises:

said cluster storage being organized so as to minimize the difference in address between alpha words which have similar keyboard typographical error propensities and so as to cluster words of a given character probability of being malsegmented into said given length;

said propensity being determined by empirical measurement of the keyboard character transfer function;

said transfer function being expressed as a series of equations representing each character probability of being confused into a false output character;

said equations being solved for the optimum character value set which assigns higher numeric values to highly reliable characters and higher numeric values to characters which occur more frequently and lower numeric values to less reliable characters and lower numeric values to characters which occur less frequently;

said malsegmentation probability being determined by the keyboard character transfer function;

said transfer function being expressed as a series of values representing the probability of a character being malsegmented;

said values being used to calculate the probability of each word being malsegmented;

said word malsegmentation probability being compared with a minimum threshold so that words whose malsegmentation propensity exceeds this threshold are stored with words of adjacent lengths;

whereby said cluster storage is organized in light of a global constraint so that no numeric assignment of two characters which can be mistyped into one another will differ in location by more than a predetermined error interval.

7. The post processing error correction system comprising:

a word generating source having a character transfer function which represents the error propensity of multicharacter words output thereby;

a binary reference matrix having an input line connected to the input of said word generating source, to detect invalid alpha words;

said binary reference matrix having an output control line carrying a binary signal which indicates whether the input alpha word is valid;

a gate means connected to said output from said word generating source and having a control input from said control output of said binary reference matrix, for gating the input alpha word from said word generating source onto a first output line in response to a signal on said control line from said binary reference matrix indicating that said alpha word is valid, and gating said input alpha word onto a second output line in response to a signal from said binary reference matrix control line indicating said alpha word is invalid;

a cluster storage apparatus having an input connected to said second output line from said gating means, to access from an associative memory therein, a group of correct alpha words which have some probability of having been confused with said invalid alpha words input on said second output line from said gate;

the regional context error correction apparatus having an input connected to said output from said gating means and having a second input connected to the output from said cluster storage apparatus for accepting said group of correct alpha words;

said cluster storage apparatus executing a conditional probability analysis to determine which one of the group of correct alpha words most closely corresponds to the invalid alpha word output by said word generating source;

said regional context error correction apparatus outputting the word which most closely corresponds to the invalid alpha word output by said word generating source;

whereby the most probable correct version of a garbled word output from said word generating source, is determined.

8. The post processing error correction system of claim 7 wherein said word generating source is an optical character recognition machine.

9. The post processing error correction system of claim 7 wherein said word generating source is a speech analyzer and said output alpha words are composed of a sequence of phoneme characters.

10. The post processing error correction system of claim 7 wherein said word generating source is a keyboard having a character transfer function representing the propensity for the commission of typographical errors.

* * * * *